United States Patent [19]

Nagahisa

[11] Patent Number: 5,203,933

[45] Date of Patent: Apr. 20, 1993

[54] TIRES FOR MOTOR VEHICLES

[76] Inventor: Kouichi Nagahisa, 2-37, Ekinan 4-chome, Takaoka-shi, Toyama-ken 933, Japan

[21] Appl. No.: 625,966

[22] Filed: Dec. 11, 1990

[51] Int. Cl.⁵ .............................................. B60C 11/11
[52] U.S. Cl. .................................. 152/209 R; 152/210; D12/146
[58] Field of Search ............... 152/209 R, 209 B, 210; D12/139, 140, 146, 147

[56] References Cited

U.S. PATENT DOCUMENTS

| | | | |
|---|---|---|---|
| 3,001,568 | 9/1961 | Suominen | 152/209 R |
| 3,991,802 | 11/1976 | Yokota et al. | 152/210 |
| 4,667,718 | 5/1987 | Fontaine | 152/209 R |

FOREIGN PATENT DOCUMENTS

0067578 10/1975 Australia .
0240269 10/1987 European Pat. Off. .
0143108 7/1985 Japan .
0223006 9/1989 Japan .
0226406 9/1989 Japan .

Primary Examiner—Michael W. Ball
Assistant Examiner—Nancy T. Krawczyk
Attorney, Agent, or Firm—Flynn, Thiel, Boutell & Tanis

[57] ABSTRACT

There is disclosed tires for motor vehicles each having a tread provided with a plurality of large convex portions and small convex portions, the convex portions and the small convex portions being differentiated in heights and areas thereof, the small convex portions being disposed around the large convex portion for forming a plurality of normal pyramidal structures. The normal pyramidal structures are formed by disposing the large concave portion around the small concave portion. There is formed a reversed pyramidal structure by disposing the large convex portions around the small convex portion.

11 Claims, 5 Drawing Sheets

TIRES FOR MOTOR VEHICLES

BACKGROUND OF THE INVENTION

1. Field of the Invention

The present invention relates to tires for motor vehicles such as automobiles, bicycles, fork-lift trucks and the like.

2. Description of the Prior Art

Tires originate in iron rings engaged with outer peripheral surfaces of wheels for preventing wear caused by contacting the ground. Due to the development of synthetic rubber, all the motor vehicles nowadays employ tires made of rubber.

The rubber tires are divided into pneumatic ones containing air therein and solid ones having no air therein. The pneumatic tires are divided into ones having tubes therein and tubeless ones. These tires each has a tread having stripes or concave and convex patterns in order to prevent the tires from spinning or sliding. There are also employed snow tires having spikes which tires are concave in or convex on the tread portions to a large extent or spike (studded tires having protrusions embedded into the tread so that the motor vehicles can run smoothly without tire on the snow.

As mentioned above, the tread of the rubber tire is hitherto devised in its shape to improve the running stability and cushion property in order to prevent tire spinning or sliding. However, the conventional rubber tire is not sufficient in running stability, especially it does not provide stability on snow.

That is, according to the conventional tires, the tires are likely to rise upward during high speed running which entails unstable running. Paricularly since the rear wheels are likely to rise upward, a tail plane or a spoiler is provided at the rear portion of the motor vehicle for preventing the tail from rising upward by utilizing wind velocity.

Inasmuch as the conventional snow tire has the convex and the concave portions which bite into the snow and are clogged by the snow, the convex and the concave portions do not function properly. Accordingly, spike tires are employed in most cases instead of the snow tires.

The spike tires can prevent the sliding of the tires even if the convex and concave portions are clogged by the snow since the protrusions from the tread bite into the snow.

However, there are such problems in the spike tire that since the protrusions always protrude from the tread, the road surface is peeled off and dispersed into the air as dust when the motor vehicles do not run on the snow. This entails generating so-called dust pollution damaging to the health of the people neighboring the road and vanishing erasing lines on the road due to damaging of the road. To overcome the problems set forth above, there is developed the spike tire employing an amorphous metal alloy whereby the protrusions are contracted when the temperature increases to a given value. However, the amorphous metal alloy is expensive and there is not always present a close relation between the temperature and the presence of the snow. Hence, the protrusions are liable to protrude from the tread even on a road having no snow thereon.

SUMMARY OF THE INVENTION

The present invention is, in view of the circumstances set forth above, to provide tires for motor vehicles capable of preventing spinning or sliding of the tires, obtaining stable running by close contact of the tread with the road, and capable of preventing the road surface from being damaged to generate the dust pollution since the sliding prevention function on the road is well performed and the protrusions function only when necessary.

The inventor of the present application has made various and researches to achieve the above object and found that fluid particles in the suction concave portion formed in the tread do not come off from the suction concave portion due to reception of air resistance and the suction concave portion functions properly. Accordingly, the inventor made the following four aspects of the invention.

(1) According to the first aspect of the present invention, tires for motor vehicles are structured to have a tread provided with a plurality of large convex portions and small convex portions wherein the large convex portions and the small convex portions are differentiated in heights and areas thereof and the small convex portions are disposed around the large convex portions for forming a plurality of normal pyramidal structures.

(2) According to the second aspect of the present invention, for motor vehicles are structured to have a tread provided with a plurality of large convex portions and small convex portions wherein the large convex portions and the small convex portions are differentiated in heights and areas thereof and the large convex portions are disposed around the small convex portions for forming a plurality of reversed pyramidal structures.

(3) According to the third aspect of the present invention, tire for motor vehicles are structured to have a tread provided with suction concave portions for effecting suction operation by wind pressure caused by air passing the peripheral surface of the tread.

(4) According to the fourth aspect of the present invention, tires for motor vehicles are structured to have a tread provided with a plurality of large convex portions, middle convex portions and small convex portions wherein at least one of the middle portions and the small convex portions have dimples while are capable of rotatably accommodating most portions of spherical bodies which protrude like spike tires.

According to the first and second aspects of the present invention, in case that the large and small convex portions are arranged on the tread, the large convex portions having large area are pressed down on the road and the small convex portions slightly and auxiliary touch the ground due to the difference of heights therebetween so that there is obtained in the normal running the friction necessary for preventing the spinning or sliding running due to the contact between the large convex portions and the road surface. Furthermore, when a brake pedal is suddenly pressed, the large convex portions are collapsed by the shock thereof and the small convex portions contact the road surface with high intensity so that two stage frictional resistance is generated by the contact between the large and small concave portions which entails strong braking of the motor vehicle. Particularly, in the emergency case, the motor vehicle can stop suddenly.

In the case that the brake pedal is pressed suddenly, namely, the motor vehicle is braked suddenly or the road surface having the concave and convex portions, the shock of the brake can be absorbed in two stages by the large convex portions and the small convex portions, hence the amount of absorption of the shock is conspicuously large and the cushion property of the motor vehicle is remarkably comfortable.

Even if the large concave portions and the small concave portions are arranged on the tread, there are formed convex portions at the concave portions, hence, the same effect can be achieved with less amount compared with the above effect.

Furthermore, the convex portions bite into the snow on the snow-covered road or the concave portions bite into the snow so that the tire spinning can be prevented in the same way as the conventional one. However, when the normal pyramidal structure comprises the large convex portions and the small convex portions, the portions defined between the normal pyramidal structures bite into the snow, and even in the reversed pyramidal structure, the portions defined between the reversed pyramidal structures bite into the snow, which result in preventing tire spinning and sliding on the snowy road.

Still furthermore, the normal pyramidal structure is considered to be very stable, hence if it is employed in the surface of the tread, the tread can bring into close contact with the road surface when the motor vehicles run at high speed. As a result, there is no likelihood of involving the danger of rising the tires upward, thereby obtaining the stable running property.

According to the third aspect of the present invention for generating suction operation in the suction concave portions, there is formed a thin air layer between the tires made of rubber and the concave and convex portions of snow, ice, water, earth and sand, and the like. There is also generated a turbulence of air current or the concentration thereof which results in generating a negative pressure in the suction concave portions and induces the suction operation.

Inasmuch as the layer of the air current generated at the portion between the tires and the road surface becomes long, the area contacting the ground is increased so that the stable running can be achieved.

BRIEF DESCRIPTION OF THE DRAWINGS

FIGS. 1 to 10 are views of assistance in explaining the principle of first to third embodiments of the present invention; in which

FIGS. 11 to 16 are views of assistance in explaining tires of motor vehicles according to a first embodiment of the present invention, in which;

FIGS. 21 to 27 are views of assistance in explaining tires of motor vehicles according to a third embodiment of the present invention, in which;

The normal and reversed pyramidal structures will be described more in detail with reference to FIGS. 1 to 10.

Figure 1:
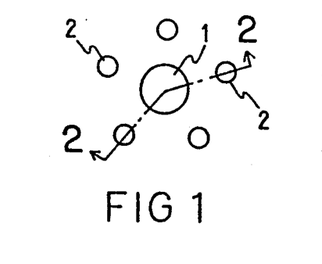
FIG. 1 shows an arrangement of large and small convex portions.
Figure 2:
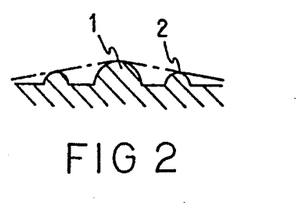
FIG. 2 is a cross sectional view taken along 2—2 in FIG. 1.
Figure 3:
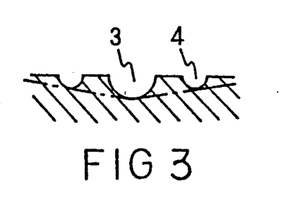
FIG. 3 is a cross sectional view of an arrangement of large and small concave portions and corresponding to FIG. 2.

As illustrated in FIGS. 1 and 2, five small convex portions 2 are arranged around one large convex portion 1 and spaced in the same intervals, which forms the normal pyramidal structure as shown in one dotted line in FIG. 1. If five large convex portions 1 are arranged around one small convex portion 2, then the reversed pyramidal structure is formed. On the other hand, if five small concave portions 4 are arranged around one large concave portion 3 and spaced at the same intervals, there is formed the normal pyramidal structure as shown in FIG. 3. The reversed arrangement of FIG. 3 forms the reversed pyramidal structure.

When the pentagon is formed by arranging five concave or convex portions around one convex or concave portion, there is obtained the stability based on the golden section and there is such an effect that the pentagonal arrangement can absorb the lateral wave motion, large and small vertical wave motions, and three dimensional (mixed) wave motions.

Figure 4:
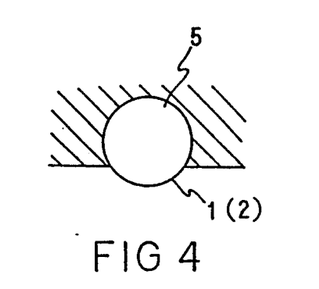
FIGS. 4 and 5 are cross sectional views of convex portions and concave portions on a surface of tread of a tire according to another aspect of the invention.
Figure 5:
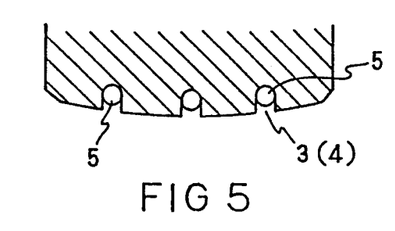

It is possible to form the convex portions 1 and 2 and the concave portions 3 and 4 by incorporating them into the tires but it is formed by embedding a ball 5 or balls 5 in the tires as illustrated in FIGS. 4 and 5. If the ball 5 or balls 5 are rotatable, the snow will melt by the frictional heat caused by the friction between the tires and the road surface, which is utilized in dispersing the snow on the road. The length of the protrusion of the ball from the surface of the tire is preferable to be one fifth to one third of the total length thereof and if it reaches over one third, it is preferable to be replaced with another ball.

Figure 6:
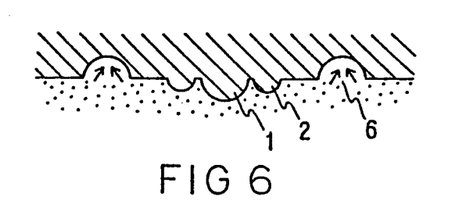
FIGS. 6 to 8 are cross sectional views of the arrangement according to still another aspect of the invention.
Figure 7:
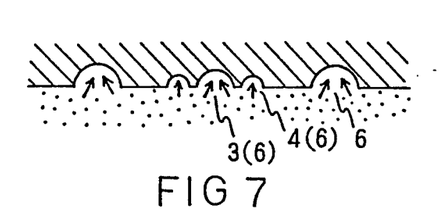
Figure 8:
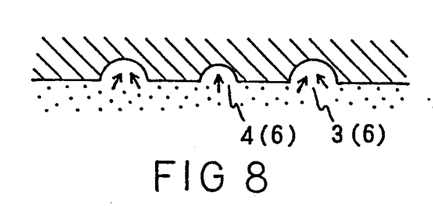

FIGS. 6 to 8 show the suction operation in the suction concave portion 6 as denoted at the arrows. With the suction operation, the tire spinning or the sliding of the tires can be prevented. If the shape of the suction portions 6 are spherical, the suction operation can affect effectively to prevent tire spinning or sliding with ease.

Figure 9:
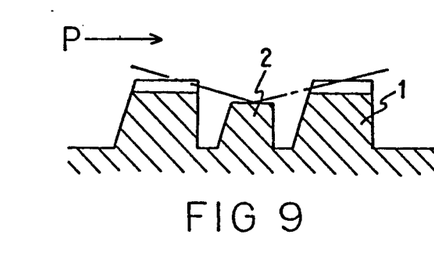
FIGS. 9 and 10 are cross sectional views of the arrangement according to still another aspect of the invention.
Figure 10:
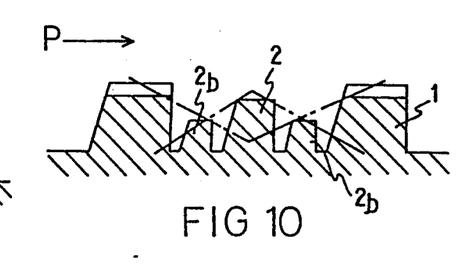
Figure 11:
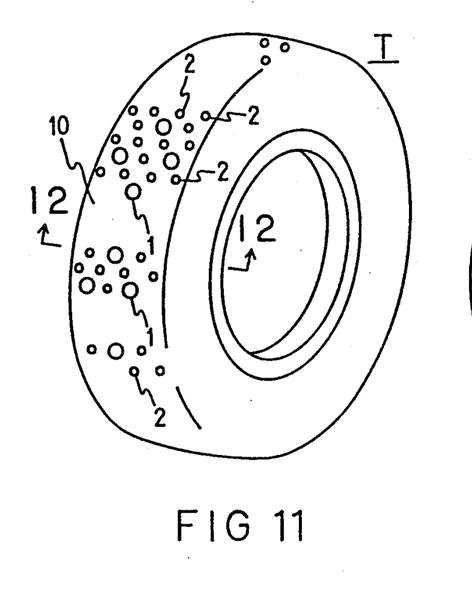
FIG. 11 is a perspective view of a tire T.
Figure 12:
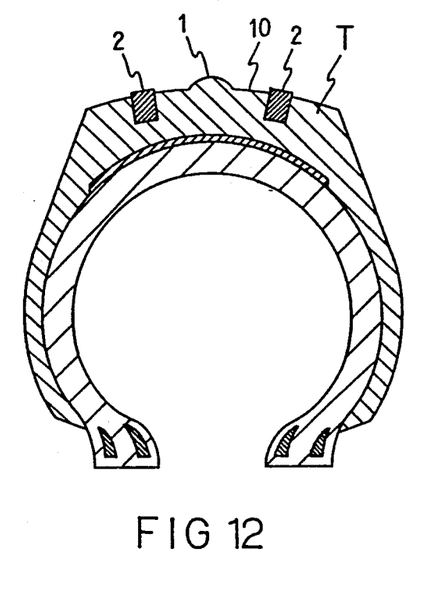
FIG. 12 is an exploded cross sectional view taken along the arrows 12—12 in FIG. 11.

It is preferable that the shape of the tire is angular at the peripheral side P thereof for preventing the tire from being spinning or sliding as illustrated in FIGS. 9 and 10. If the combination of the normal and the reversed pyramidal structures is formed by adding the smallest convex portions 2b (the small convex portion 2 is then considered to be middle convex portion), there is generated the turbulence of air current or water, which involve the various functions, described later.

The large and small convex portions can be formed integrally with the formation of the rubber of the tire or they can be formed by embedding the different members into the tire. The material thus embedded may be a synthetic rubber, metal, synthetic resin, or the compound thereof.

The shapes of the large and small concave and convex portions are various such as circular, oval, triangular, polygonal, trapezoidal, and may be differentiated in the shapes thereof at the large and small convex and concave portions. It is preferable to shape the large and small convex portions such that the large convex portion is made soft and the small convex portion is made rigid to engage with another to obtain the high cushion property and the high braking performance.

The ball 5 is made of iron, ceramics, plastics, rigid rubber and the like. The ball is in principle to be fixed, but it may be rotatable. If the ball is provided with an engaging portion such as a dimple, there is generated the resistance suitably. The ball 5 may be angular shaped such as trianglular, square, pentagonal, hexagonal, octagonal and other angular shaped or oval. Furthermore, even if there are provided slits in addition to the large and small convex and concave portions on the tread surfaces of the tires, such provisions are not contrary to the gist of the present invention, in other words, they are within the scope of the present invention.

According to the fourth embodiment of the present invention, in addition to a sliding prevention effect due to the provision of the large, middle and small convex portions on the surface of the tread, there is generated an air current between the large convex portions when the surface of the tread receives the wind pressure when the tires rotate, whereby air turbulence is generated due to the presence of the middle and small convex portions between the large convex portions. As a result, there is generated a negative pressure due to the air turbulence, which brings about a biting effect if the road is covered by snow, an absorption effect if the road is covered by ice and a draining effect if the road is covered by water. When the air turbulence occurs, the liquid particles inside or outside the layer defined between the surface of the tread and the road surface are mixed with each other, air is hardly broken away or separated and the separating point lowers so that the drag coefficient is very reduced which entails the reduction of the air resistance of the tires. Meanwhile, there is generated the same phenomenon in the golf ball provided with a plurality of concave portions for inducing the air turbulence quickly to reduce the drag coefficient so that the ball can fly for a long distance and to increase the lift due to rotation or spin of the ball so that the ball can fly stably on the desired course. Inasmuch as the protrusions of the ball can be provided in the middle or small convex portions, the protrusions hardly contact the road surface at the normal driving on the asphalt road and the like. Even if the protrusions contact the road surface, the road surface is not likely to be damaged.

However, since the large concave portions bite into the road surface in case that road is covered by snow and contact the snow, the large convex portions function to operate like the studs of studded tires.

When the motor vehicles are braked suddenly or the speed is accelerated suddenly even on the normal road surface or snow-covered surface or icy surface, the large concave portions are collapsed, thereby increasing the air pressure of the tire momentarily to push out the protrusions. At this time, the protrusions contact the road surface so that the motor vehicles can be braked hard and the speed can be accelerated suddenly. The balls do not rotate due to the abrupt generation of the pressure.

However, the tire normally rotates inch by inch so that the frictional heat is generated by the rotation thereof and the snow and ice attached to the tires are melted by the frictional heat. Hence, the surface of the tread having concave and convex portions are kept at a normal state in which they are not clogged by the snow or ice, which contributes to the dispersion of the snow on the road. As the material of balls, there are listed plastics, rigid rubber, iron, ceramics and the like.

The above and other objects, features and advantages of the present invention will become more apparent from the following description.

PREFERRED EMBODIMENT OF THE INVENTION

First Embodiment (FIGS. 11 to 16)

Tires of motor vehicles according to a first embodiment of the present invention will be described with reference to FIGS. 11 to 16.

Figure 13:
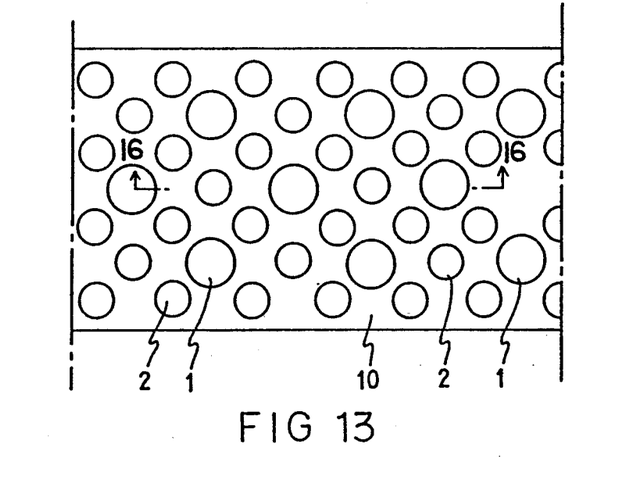
FIG. 13 is a plan view of a surface of tread.

There are protruded a plurality of convex portions 1 and a plurality of small convex portions 2 and arranged in the manner that the large convex portions 1 are alternately disposed vertically, laterally and aslant with intervening the small convex portions 2 therebetween.

Figure 14:
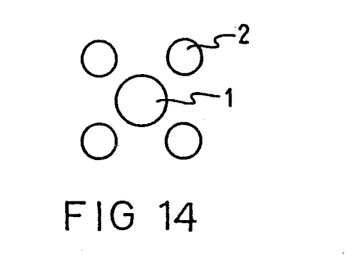
FIGS. 14 and 15 are views of assistance in explaining an arrangement of a normal pyramidal structure formed on the surface of the tread.
Figure 15:
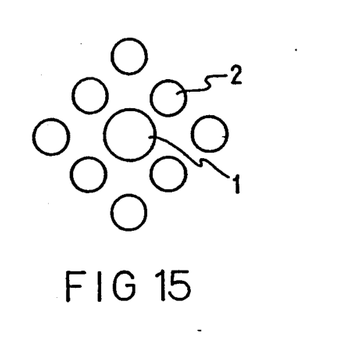
Figure 16:
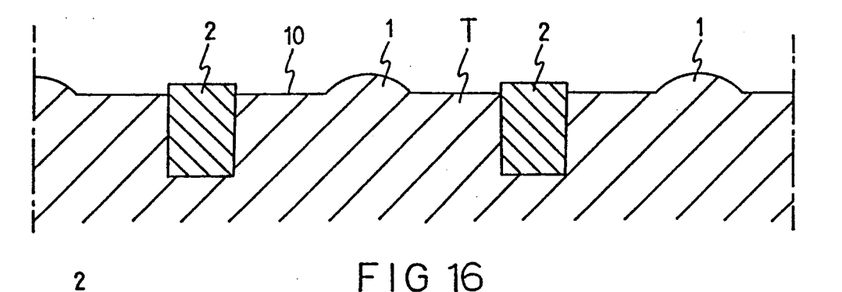
FIG. 16 is an exploded cross sectional view taken along the arrows 16—16 in FIG. 13.

With the arrangement set forth above, there is structured such a normal pyramidal structure that four small convex portions 2 are arranged around one large convex portion as illustrated in FIG. 14. Furthermore, there is also structured such a normal pyramidal structure that eight convex portions 2 are arranged around one convex portion 1. The large convex portion 1 is convex and integrally formed with the rubber of a tire T while the small convex portions are protruded by embedding cylindrical metal pieces into the tire and they have a diameter smaller and a height lower than the large convex portion.

With the arrangement set forth above, the large convex portions 1 which are softer than the small convex portions 2 and have friction greater than the convex portions 2 mainly contact the road surface at the normal driving, hence the rigid small convex portions 2 do not contact the road surface or slightly contact the road surface so that the high cushion property can be obtained, whereby the driver can drive comfortably and there is no likelihood that the road surface will be worn by the rigid small convex portion 2.

However, when the motor vehicles are braked suddenly, the large concave portions 1 are collapsed to a large extent, the small convex portions 2 bite into the road surface so that the vehicles can stop at the same time when the vehicles are braked without sliding. While on the snowy road surface, the large convex portions 1 bite into the snow and the small convex portions 2 also bite into the snow, so that the motor vehicles can run smoothly without spinning their wheels.

The studded tires are conventionally designed to run without spinning or sliding on the snowy road. However, the snow tires are liable to wear the road surface or generate the dust pollution and to erase the lines at the time when they are used on the normal road surface. The tires according to the first embodiment of the present invention can obtain the stable running characteristic or property on the road the same as the spike tires without generating the dust pollution and erasing the lines on the road.

Second Embodiment (FIGS. 17 to 20)

Tires for motor vehicles according to a second embodiment of the present invention will be described with reference to FIGS. 17 to 19.

Figure 17:
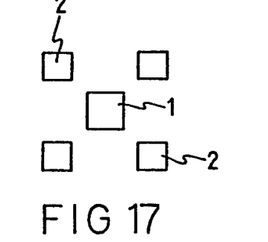
FIGS. 17 to 19 are views of assistance in explaining tires of motor vehicles according to a second embodiment of the present invention and corresponding to FIG. 14.

There is illustrated a normal pyramidal structure in FIG. 17 in which the large convex portions 1 and the small convex portions 2 are respectively square in the shapes thereof which entails improvement of the prevention of spinning of the tires.

Figure 18:
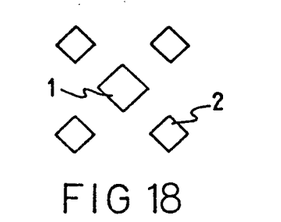

In FIG. 18, the large convex portions 1 and the small convex portions 2 are respectively formed square and arranged in the form that the diagonal directions thereof become vertical and lateral. With such an arrangement, the high cushion property is improved.

Figure 19:
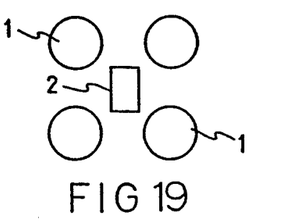

FIG. 19 shows a reversed pyramidal structure wherein the large convex portions 1 are arranged around one small convex portion 2. The small convex portion 2 is rectangular to improve the stopping performance of the motor vehicles.

Figure 20:
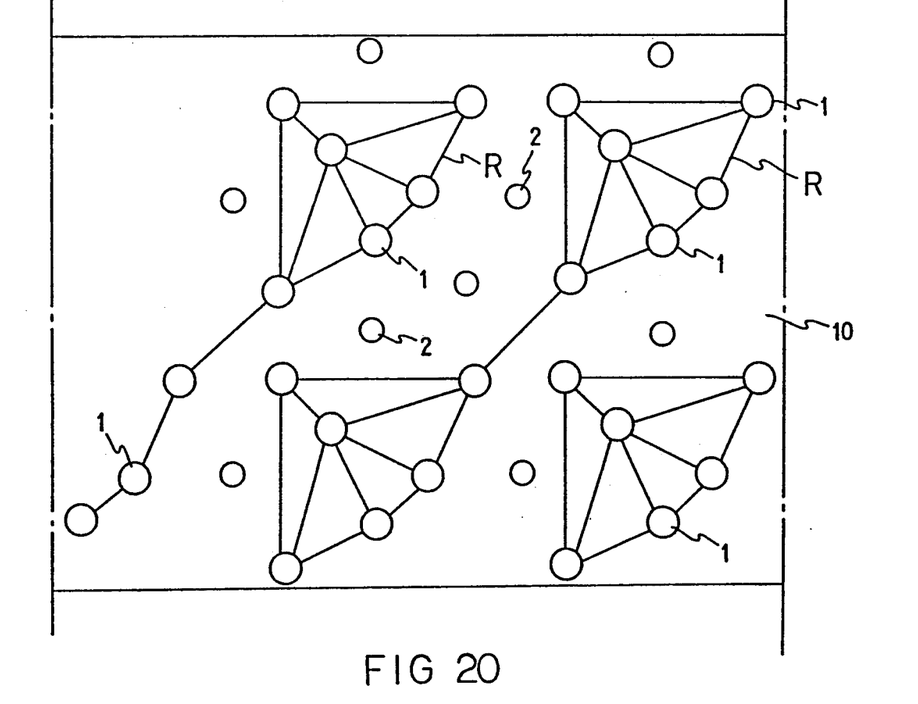
FIG. 20 is a view of assistance in explaining a pyramidal structure.

FIG. 20 exemplifies the pyramidal structure in which the curve R is generated in the arrangement of the large convex portions 1. The arrangement is very specific so that the stable running characteristic can be obtained, particulaly adapted for sliding on the snowy road.

Although the first and second embodiments relate to the pyramidal or the reversed pyramidal structure composed of the large and small convex portions, the pyramidal or the reversed pyramidal structure may be composed of the large concave and small concave portions. It is a matter of course that the latter structure has the same functions and effects as the former structure.

Third Embodiment (FIGS. 21 to 27)

Tires for motor vehicles according to a third embodiment will be described with reference to FIGS. 21 to 27.

Figure 21:
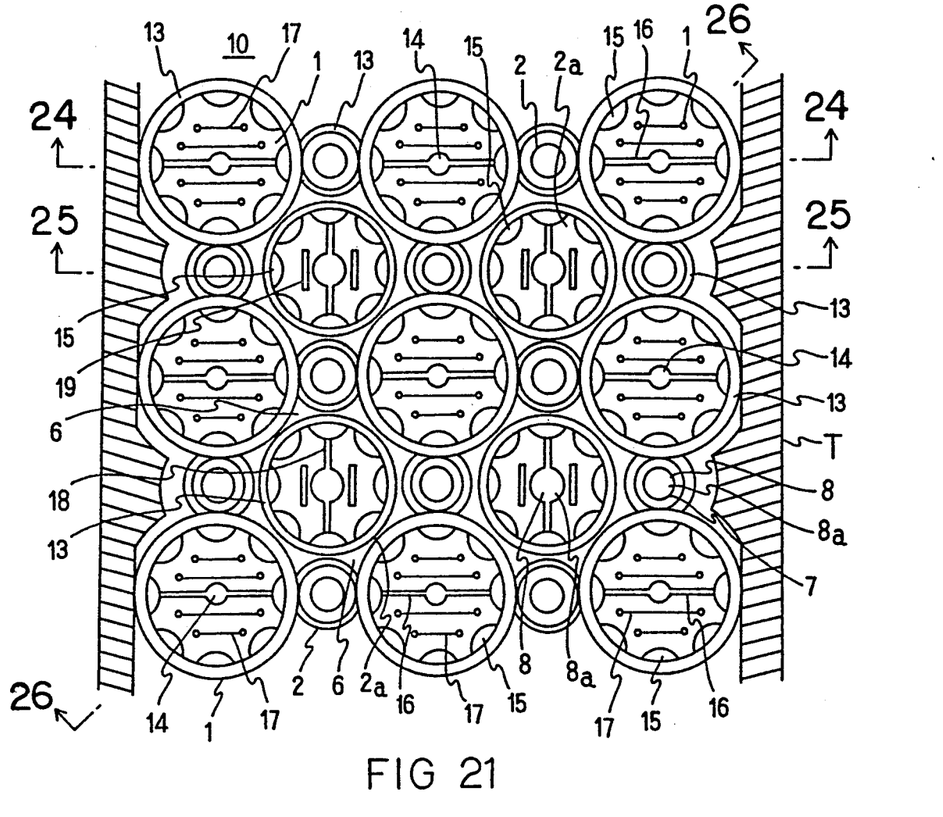
FIG. 21 is a plan view of a tread of a tire.

The surface of the tread 10 of the tire T comprises a plurality of large convex portions 1 having octagonal shapes at the upper surfaces thereof, a plurality of middle convex portions 2a having octagonal shapes at the upper surfaces thereof, a plurality of small convex portions 2 having the circular shapes at the upper surfaces thereof and a plurality of suction concave portions 6 surrounded by the large and middle convex portions 1 and 2a and small convex portions 2.

The large convex portions 1 are arranged laterally on three rows on the surface of the tread 10 and are spaced from each other at the same intervals vertically and laterally. The middle convex portions 2a are disposed aslant between the large convex portions 1, while the small convex portions 2 are disposed vertically and laterally between the large convex portions 1. The areas and heights of the large convex portions 1 are greater than those of the middle convex portions 2a which are greater than those of the small convex portions 2. The ratio of the area and height therebetween are set to be 3:2:1. With the arrangement set forth above, there are pyramidal structures composed of four middle convex portions 2a disposed around one large convex portion 1 and pyramidal structures composed of four small convex portions 2 disposed around one large convex portion. Furthermore, there are pyramidal structures composed of four small convex portions disposed around the middle convex portions 2a. There also appear the reversed pyramidal structures composed of four large convex portions 1 around one middle convex portions 2a.

When the surface of the tread 10 is composed of such normal pyramidal structures, there is formed a thin air layer betwen the rubber tire and snow, ice, water, earth and sand wherein the turbulence or the concentration of the air current is generated at the inner side of the pyramidal structure. Due to generation of the turbulence or the concentraion, the negative pressure is generated in the suction concave portions 6 so that the suction concave portions perform the suction operation.

There are formed inclination surfaces 13 at the peripheral edges of the large, middle and small convex portions 1, 2a and 2 which inclination surfaces 13 are lowered at the outside thereof. Pin holes 14 are formed at the center of the large convex portions 1. There are formed notched portions 15 at the inner sides of the inclination surfaces 13 of the large and middle convex portions 1 and 2a and directed at eight directions from the center of the large and middle convex portions 1 and 2a which notched portions 15 are crescent shaped and lowered at the outsides thereof. Due to existence of these notched portions 15, water is expelled. Due to biting into snow, ice, the motor vehicles can certainly drive. Furthermore, since the notched portions 15 are directed toward eight directions, the tire can absorb resistance, vibrations, wave motions of the road from any dirction, i.e. 360° whereby the handling is smooth even on a snowy or icy road.

The large convex portions 1 each have one lateral grooved stripe 16 at the upper central portion and two slits 17 above and two slits 17 below the grooved stripe 16. With such an arrangement, the cushion property is improved and the area of contact with the ground becomes large, thereby preventing the tire from spinning and sliding.

The middle convex portions 2a each have a vertical grooved stripe 18 at the central portion and vertical grooved stripes 19 on the right and left sides of the grooved stripe 18. With such an arrangement, the braking performance can be improved when the vehicle is braked suddenly. Furthermore, the gripping force with the ground is improved.

There is generated in the suction concave portions 6 an absorption effect, i.e. effect to absorb ice, an expellation effect, i.e. effect to expel water from the tread, and double biting effect, i.e. effect to bite into snow since the large, middle and small convex portions are structured in the normal pyramidal structure and/or the reversed pyramidal structure.

Figure 23:
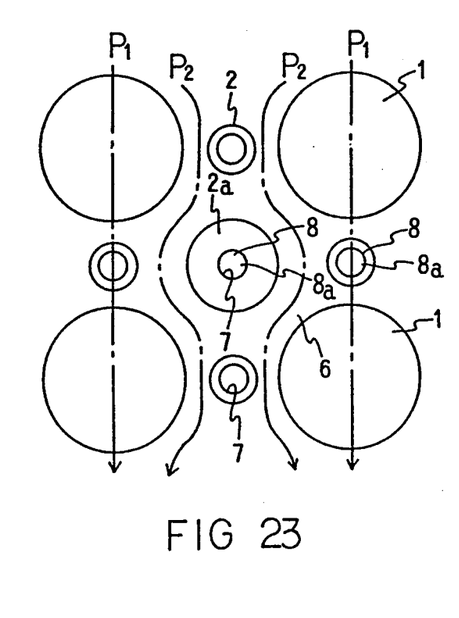
FIG. 23 is a view of assistance in explaining a flow of air current on the surface of the tread.
Figure 24:
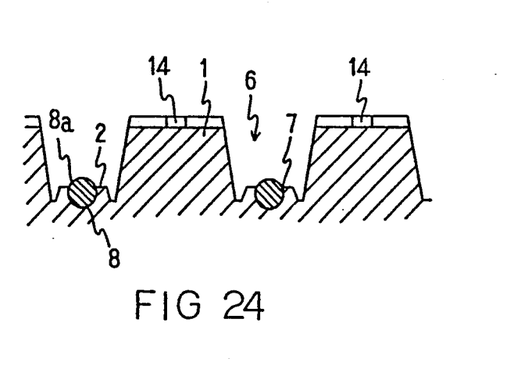
FIGS. 24, 25 and 26 are cross sectional views taken along the arrows 24—24, 25—25 and 26—26 in FIG. 21.
Figure 25:
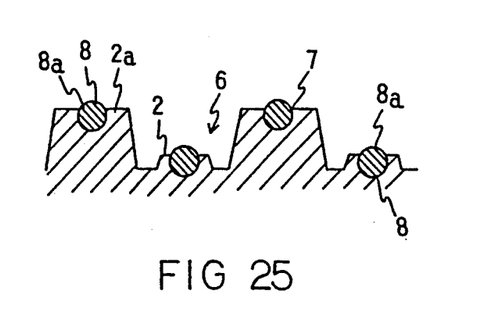

In FIG. 23, the arrows $P_1$, $P_2$ show the air currents, wherein the air currents $P_1$, $P_1$ extend straight at the portion where the large convex portions 1 are arranged and the air currents $P_2$, $P_2$ pass the portions between the large convex portions 1 and are bent by the middle convex portions 2a and are restricted by the small convex portions 2 whereby the air current passes in zigzags.

Figure 22:
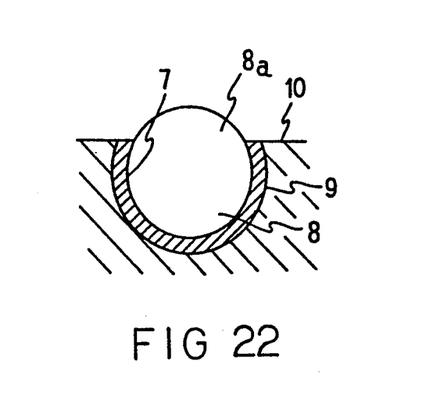
FIG. 22 is a cross sectional view of assistance in explaining a state of engaging a ball in the tread.

There are provided dimples 7 at the upper surfaces of the middle and small convex portions 2a and 2 and balls 8 are rotatably engaged in the dimples 7. The dimples 7 are formed by embedding holders 9 into the surface of the tread 10 although they can be formed integrally with the surface of the tread 10 for effectively preventing the balls 8 from coming out from the surface of the tread 10.

The holders 9 each have a hollow spherical ball cut at the upper end portion in which the ball 8 is engaged without coming off therefrom. A part of the ball 8 protrudes from the surface of the tread as a protrusion 8a. The balls 8 and the holders 9 are respectively formed of plastics.

Figure 26:
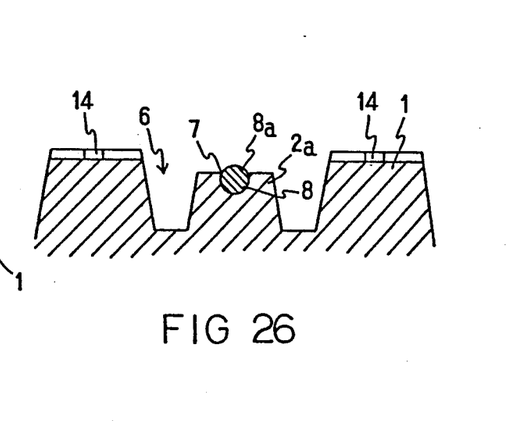
Figure 27:
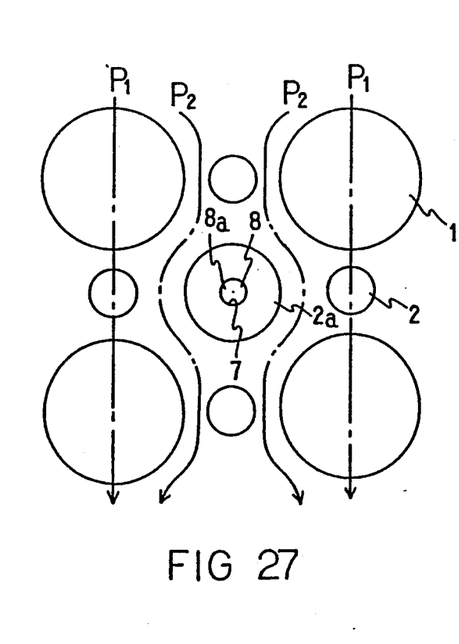
FIG. 27 is a view of assistance in explaining a flow of air current on the surface of the tread according to another aspect of the invention.

In FIG. 26, the ball 8 are provided on the middle convex portion 2a alone. In this arrangement, the small convex portions 2 function to affect the air turbulence only as shown in FIG. 27.

It is a matter of course that the same functions and effects can be obtained even if the large, middle and small convex portions are replaced with the large, middle and small concave portions or with the combination of the convex and concave portions.

Furthermore, the notched portions 15 are not limited to the crescent shape but may be of other shape such as linear.

When the large convex portions 1 having octagonal shapes at the upper portions thereof are arranged in parallel with each other, it is preferable to arrange them in odd number such as 1, 3, 5, . . .

With the arrangement according to the first and second aspects of the present invention, inasmuch as the arrangement of the large and small convex portions or the large and small concave portions form the normal pyramidal structure or the reversed pyramidal structure, the cushion property can be conspicuously improved and the spinning or sliding of the tire can be prevented. Still furthermore, the surface of the tread is brought into contact with the road surface to improve the running stability when running at high speed whereby the vehicles can run on the highway or the icy road with safety and can run safely on the snowy road or the muddy road without any trouble.

In addition to the above effects, according to the third aspect of the present invention, there is such an excellent effect that the tire can be brought into contact with the road surface more satisfactorily so that the motor vehicles can run more comfortably due to the presence of the suction concave portions.

According to the fourth aspect of the present invention, the large, middle and small convex portions having different areas and heights are arranged on the surface of the tread, and there is generated air turbulence in the air current passing through the large convex portions which entails the suction operation at the surface of the tread, thereby obtaining the absorption effect on the icy road, expelling effect on the road covered by water, and the biting effect on the snowy road. Furthermore, since there are provided dimples at least at the upper surface of one of the middle and small convex portions in which most parts of the balls are rotatably engaged, and protrusion protruded from the ball functions as the spikes in the spike tire, only the large convex portions contact the road surface at the normal driving but the protrusions do not contact the road surface. Accordingly, it is possible to prevent the damage of the road and dust pollution and function to brake hard or accelerate suddenly or on the snowy road.

Although the invention has been described in its preferred form with a certain degree of particularity, it is to be understood that many variations and changes are possible in the invention without departing from the scope thereof.

What is claimed is:

1. A tire for a motor vehicle, said tire having a ground-contacting tread having a tread pattern comprising a plurality of large-size convex portions, a plurality of middle-size convex portions, a plurality of small-size convex portions and a plurality of concave, suction portions surrounded by said large-size, said middle-size and said small-size convex portions, said convex portions having outermost ground-contacting tread surfaces, the heights of said large-size convex portions being greater than the heights of said middle-size convex portions and the heights of said middle-size convex portions being greater than the heights of said small-size convex portions, the areas of said large-size convex portions being greater than the areas of said middle-size convex portions at the outermost ground-contacting tread surfaces thereof, and the areas of said middle-size convex portions being greater than the areas of said small-size convex portions at the outermost ground-contacting tread surfaces thereof.

2. A tire for a motor vehicle according to claim 1, in which said tread pattern comprises pyramidal structures composed of four middle-size convex portions disposed around one large-size convex portion and pyramidal structures composed of four small-size convex portions disposed around one large-size convex portion.

3. A tire for a motor vehicle according to claim 1, in which said tread pattern comprises pyramidal structures composed of four small-size convex portions disposed around each middle-size convex portions.

4. A tire for a motor vehicle according to claim 1, further comprising inclination surfaces formed at the peripheral edges of the large-size, middle-size and small-size convex portions, said inclination surface of each convex portion converging toward the outermost ground-contacting tread surface thereof.

5. A tire for a motor vehicle according to claim 4, further comprising eight spaced-apart notched portions in the side of each said inclination surface of said large-size and middle-size convex portions adjacent to he outermost ground-contacting tread surface thereof, said notched portions being crescent shaped in plan view.

6. A tire for a motor vehicle according to claim 1, wherein said large-size convex portions each have one lateral grooved stripe through the central portion of the outermost ground-contacting tread surface thereof and two slits disposed over and under the grooved stripe, and said middle-size convex portions each have a longitudinal grooved stripe at the central portion and longitudinal grooved stripes at the right and left of the longitudinal grooved stripe.

7. A tire for a motor vehicle according to claim 1, wherein said large-size and middle-size convex portions having respectively octagonal shapes at the outermost tread surfaces thereof, the small convex portions having circular shapes.

8. A tire for a motor vehicle according to claim 1, wherein said large-size convex portions are arranged laterally in three rows on the surface of the tread and spaced from each other at the same intervals longitudinally and laterally, said middle-size convex portions are disposed diagonally and between said large-size convex portions, and said small-size convex portions are disposed longitudinally and laterally between said large-size convex portions.

9. A tire for a motor vehicle according to claim 1, wherein the ratios of said areas and heights of said large-size convex portions: said middle size convex portions: said small-size convex portions are 3:2:1.

10. A tire for a motor vehicle according to claim 1, wherein at least one of said middle-size convex portions and said small-size convex portions has holders embedded in the outermost ground-contacting tread surfaces thereof, said holders defining outwardly opening cavities, and balls disposed in said cavities and protruding outwardly from said outermost ground-contacting tread surfaces.

11. A tire for a motor vehicle according to claim 1, further comprising pin holes formed at the center of outermost ground-contacting tread surface of said large-sized convex portions.

* * * * *

UNITED STATES PATENT AND TRADEMARK OFFICE
CERTIFICATE OF CORRECTION

PATENT NO. : 5 203 933

DATED : April 20, 1993

INVENTOR(S) : Kouichi NAGAHISA

It is certified that error appears in the above-identified patent and that said Letters Patent is hereby corrected as shown below:

Column 10, line 39; change "he" to ---the---.

line 67; change "middle size" to ---middle-size---.

Signed and Sealed this

Fourth Day of January, 1994

*Attest:*

BRUCE LEHMAN

*Attesting Officer*　　　*Commissioner of Patents and Trademarks*